UNITED STATES PATENT OFFICE 2,503,338

PRECIPITATION OF EMULSIONS OF STYRENE AND COPOLYMERS THEREOF

Ernest P. Irany, Cranford, and Anthony J. Geraci, Newark, N. J., assignors to Celanese Corporation of America, a corporation of Delaware No Drawing. Application September 12, 1945, Serial No. 615,922

8 Claims. (Cl. 260—93.5)

This invention relates to the treatment of emulsions of polystyrene or other polymerized styrene compounds, and relates more particularly to the precipitation of said polymerized styrene compounds from said emulsions in a highly stable form capable of yielding clear, colorless molded products.

An object of this invention is to provide an improved process for the precipitation of polystyrene or other polymerized styrene compounds from aqueous emulsions thereof.

Another object of this invention is the provision of a process for the recovery of polystyrene or other polymerized styrene compounds from the aqueous emulsions thereof, in which polymerization has been effected, in a highly stable form capable of being molded without decomposition.

A further object of this invention is the precipitation from their aqueous emulsions of polymerized styrene compounds in a form substantially free of occluded emulsifying or other foreign agent.

Other objects of this invention will appear from the following detailed description thereof.

Aqueous emulsions of monomeric styrene compounds may be produced by emulsifying a monomeric styrene compound in water with the aid of a suitable emulsifying agent. These aqueous emulsions of the monomeric styrene compound may be readily converted into emulsions of polymerized styrene compounds by adding a polymerization catalyst to the monomeric emulsion and stirring at a temperature of 60 to 80° C. for several hours in an inert atmosphere, such as nitrogen, until the styrene compound is substantially polymerized. The polymerized styrene compounds obtained from emulsions thereof are of much higher molecular weight and possess higher impact strength and better resistance against heat distortion than polymerized styrene compounds made by effecting the polymerization in solution or in bulk.

Heretofore, the polymerized styrene compounds prepared by emulsion polymerization were separated from the emulsion by various processes including freezing the emulsion or adding alcohols, acids or salts to the emulsion. While the coagulation or precipitation of polymerized styrene compounds from their emulsions after the completion of the polymerization offers no problems, it is, however, quite difficult to produce a pure and stable product by the precipitation procedures previously employed. The precipitated polymerized styrene compounds always included traces of the emulsifying compound as well as traces of the water or other agents employed in the polymerization procedure. The emulsifying agents are entrapped or held very tenaciously by the precipitated polymerized styrene compounds and, when the latter are subjected to molding operations, the emulsifying agent or water held therein causes the molded product to become discolored or cloudy. Since a substantially water-white color and freedom from cloudiness is a prime requisite in many commercial applications, the color and haze of the polymerized styrene compounds prepared by emulsion polymerization renders them of more limited usefulness notwithstanding the other very desirable properties which they possess.

We have now found that polymerized styrene compounds of excellent color and transparency characteristics may be obtained by precipitating the polymerized styrene compounds from the emulsions, in which polymerization has been effected, with the aid of an aqueous solution of an alkali of the fixed alkali group and by washing the precipitated polymerized styrene compounds under alkaline conditions employing said alkaline agents in the washing solutions. The use of said alkaline agents for precipitation and washing not only yields a product which may be molded with the formation of far less undesirable color, but it also permits of the removal of all or substantially all of the water or other agents which tend to cause haze or cloudiness in the molded product.

As examples of alkalies of the fixed alkali group which may be employed in accordance with the novel process of our invention, there may be mentioned sodium hydroxide, potassium hydroxide or other basic salts of said fixed alkalies such as sodium or potassium carbonate, sodium or potassium bicarbonate, or trisodium phosphate. The use of these alkalies is particularly valuable where the emulsifying agent comprises an alkali metal salt of a sulfonated or sulfated organic compound. The alkaline agents tend to suppress any tendency on the part of the alkali metal salt of the sulfonic acid group in the emulsifying agent to undergo hydrolysis; the alkali metal salts being the form in which the emulsifying agents are usually employed.

In effecting the precipitation of the polymerized styrene compounds from their emulsions, the alkaline solution may be added to the emulsion but we preferably add the polymerized emulsion to the alkaline solution in order to effect the desired precipitation since a more satisfactory type of precipitate is formed by effecting precipitation in the latter sequence. The concentration of the alkaline agent in the aqueous solution to which the emulsion of the polymerized styrene compound is added may vary. Solutions containing from 0.2 to 10% by weight of the alkaline agent are preferably employed so that upon addition of the emulsion to said aqueous solutions precipitation will take place slowly to produce a precipitate in finely powdered form. The aqueous solution of the alkaline agent used may also contain a small proportion of water-soluble organic compounds such as methanol to facilitate better extraction of the emulsifying agent. The precipitate of the polymerized styrene compound may then be washed with an aqueous solution of the alkaline agent, maintaining the alkalinity to a pH of at least 8. After washing, the polymerized styrene compound may be dried, preferably at a temperature not exceeding 80° C. The ratio of the polymerized styrene compound to the water in the emulsion to be precipitated is most conveniently adjusted prior to precipitation, if necessary, so that the polymerized styrene compound in the emulsion comprises about 10% by weight of the emulsion. Precipitation is most advantageously effected at about room temperatures, i. e., temperatures of from 20 to 30° C., but higher or lower temperatures may, of course, be employed.

Many suitable emulsifying agents may be employed in preparing the emulsion of the styrene compound which is to be subjected to emulsion polymerization, particularly the salts and esters of the reaction products of sulfuric acid with organic compounds. As suitable emulsifying agents, there may be mentioned agents such as, for example, sodium alkyl naphthalene sulfonates wherein the alkyl group is lower than hexyl, the sodium salt of aryl alkyl polyether sulfonates, sodium alkyl sulfates, alkyl aryl sulfonates and short chain alkyl aromatic sulfonates. Examples of suitable agents are isopropyl naphthalene sodium sulfonate, dodecyl benzene sodium sulfonate, decyl benzene sodium sulfonate, sulfated lauryl alcohol and sulfonated polyalkylene ether alcohols, as well as the dioctyl ester of sodium sulfosuccinic acid.

In order further to illustrate our invention, but without being limited thereto, the following examples are given:

Example I 40 parts by weight of monomeric styrene are added at room temperature to 60 parts by weight of distilled water in which are dissolved 0.4 part by weight of the dioctyl ester of sodium sulfosuccinic acid and 0.25 part by weight of hydrogen peroxide (100% $H_2O_2$ strength). The mixture is stirred together to form an emulsion in an inert atmosphere, such as nitrogen. Polymerization of the styrene is then effected by stirring the emulsion at a temperature of 60 to 80° C. until the styrene is substantially polymerized. This may be effected by stirring for about 12 hours.

200 parts by volume of the emulsion are then poured gradually into 1000 parts by volume of a 0.25% aqueous solution of sodium hydroxide, the mixing being effected with vigorous agitation. The polystyrene is precipitated in the form of a finely-divided powder, which is filtered off and washed to a pH of 8 and the wet powder then dried at 80° C. in a suitable drying apparatus, air being circulated over the powder during drying. The dry powdered polystyrene may then be shaped into a disc in a suitable mold at 200° C. for 15 minutes at a pressure of 2000 lbs. per square inch. The disc obtained is clear and colorless, being substantially water-white in appearance.

Example II

The polystyrene emulsion, prepared as described in Example I, is precipitated by being poured into a 2% aqueous solution of potassium hydroxide and is then washed and dried as described in said Example I. When the dry polystyrene powder obtained is shaped into a disc in a suitable mold at a temperature of 200° C. for 15 minutes under a pressure of 2000 lbs. per square inch, a clear, colorless disc of an excellent water-white appearance is obtained.

Example III

The polystyrene emulsion, prepared in accordance with Example I, is precipitated by being poured into a 10% aqueous solution of sodium carbonate and the precipitated polystyrene then washed to a pH of 8 with a solution of sodium carbonate and dried as described therein. When the dry polystyrene powder is shaped into a disc in a suitable mold at 200° C. for 15 minutes under a pressure of 2000 lbs. per square inch, a colorless disc of excellent appearance is obtained. The disc produced is slightly hazy but is entirely free of any brownish or yellowish discoloration.

Substantially the same result is obtained where a 5% aqueous solution of sodium bicarbonate is employed for the precipitation of the polystyrene from the emulsion.

While our invention has been more particularly described in connection with the precipitation of polystyrene from emulsions thereof in which polymerization of the styrene has been effected while the latter is in emulsified form, the process of our invention may also be employed for the precipitation of other polymerized styrene compounds or copolymers of styrene which have been prepared by emulsion polymerization methods. Examples of such other polymerized styrene compounds which may be precipitated from their emulsions in accordance with our novel process are, for example, polymerized alpha-methyl para-methyl styrene and methyl styrene as well as those polymerized styrene compounds containing a halogen substituent in the benzene ring, and copolymers of styrene and methyl methacrylate, etc.

The expression "styrene compounds" as employed in the claims is to be construed as including within its scope styrene, substitution products of styrene and copolymers of styrene and a polymerizable compound.

It is to be understood that the foregoing detailed description is given merely by way of illustration and that many variations may be made therein without departing from the spirit of our invention.

Having described our invention, what we desire to secure by Letters Patent is:

1. In a process for the recovery of polymerized styrene from aqueous emulsions thereof emulsified with emulsifying agents of the group consisting of water-soluble alkali metal salts of sulfonated and sulfated organic compounds, the steps which comprise precipitating said polymerized styrene from said emulsions by adding said emulsions to an aqueous solution containing from 0.2 to 10% by weight of an alkali of the fixed alkali group and then washing the precipitated polymerized styrene to a pH of 8 with a solution of the same alkali.

2. In a process for the recovery of polymerized styrene from aqueous emulsions thereof emulsified with emulsifying agents of the group consisting of water-soluble alkali metal salts of sulfonated and sulfated organic compounds, the steps which comprise precipitating said polymerized styrene from said emulsions by adding said emulsions to an aqueous solution containing from 0.2 to 10% by weight of an alkali of the fixed alkali group, then washing the precipitated polymerized styrene to a pH of 8 with a solution of the same alkali and drying the precipitate at a temperature not exceeding 80° C.

3. In a process for the recovery of polymerized styrene from aqueous emulsions thereof emulsified with emulsifying agents of the group consisting of water-soluble alkali metal salts of sulfonated and sulfated organic compounds, the steps which comprise precipitating said polymerized styrene from said emulsions by adding said emulsions to an aqueous solution containing from 0.2 to 10% by weight of sodium hydroxide and washing the precipitated polymerized styrene to a pH of 8 with a solution of sodium hydroxide.

4. In a process for the recovery of polymerized styrene from aqueous emulsions thereof emulsified with emulsifying agents of the group consisting of water-soluble alkali metal salts of sulfonated and sulfated organic compounds, the steps which comprise precipitating said polymerized styrene from said emulsions by adding said emulsions to an aqueous solution containing from 0.2 to 10% by weight of sodium hydroxide, washing the precipitated polymerized styrene to a pH of 8 with a solution of sodium hydroxide and then drying the polymerized styrene at a temperature not exceeding 80° C.

5. In a process for the recovery of polystyrene from an aqueous emulsion thereof in which dioctyl ester of sodium sulfosuccinic acid is employed as the emulsifying agent, the step which comprises adding said polystyrene emulsion to an aqueous solution containing from 0.2 to 10% by weight of sodium hydroxide, washing the polymerized styrene precipitate obtained to a pH of 8 with a solution of sodium hydroxide and then drying the polymerized styrene compound at a temperature not exceeding 80° C.

6. In a process for the recovery of polystyrene from an aqueous emulsion thereof in which the dioctyl ester of sodium sulfosuccinic acid is employed as the emulsifying agent, the step which comprises adding said polystyrene emulsion to an aqueous solution containing from 0.2 to 10% by weight of potassium hydroxide, washing the polymerized styrene precipitate obtained to a pH of 8 with a solution of potassium hydroxide and then drying the polymerized styrene compound at a temperature not exceeding 80° C.

7. In a process for the recovery of polystyrene from an aqueous emulsion thereof in which the dioctyl ester of sodium sulfosuccinic acid is employed as the emulsifying agent, the step which comprises adding said polystyrene emulsion to an aqueous solution containing from 0.2 to 10% by weight of sodium hydroxide and then washing the polymerized styrene precipitate obtained to a pH of 8 with a solution of sodium hydroxide.

8. In a process for the recovery of polystyrene from an aqueous emulsion thereof in which the dioctyl ester of sodium sulfosuccinic acid is employed as the emulsifying agent, the step which comprises adding said polystyrene emulsion to an aqueous solution containing from 0.2 to 10% by weight of potassium hydroxide and then washing the polymerized styrene precipitate obtained to a pH of 8 with a solution of potassium hydroxide.

ERNEST P. IRANY.
ANTHONY J. GERACI.

REFERENCES CITED

The following references are of record in the file of this patent:

UNITED STATES PATENTS

| Number | Name | Date |
|---|---|---|
| 1,908,549 | Smith | May 9, 1933 |
| 2,061,468 | Kling | Nov. 17, 1936 |
| 2,391,817 | Blackburn | Dec. 25, 1945 |